US007514387B2

(12) United States Patent
LaBarge

(10) Patent No.: US 7,514,387 B2
(45) Date of Patent: Apr. 7, 2009

(54) REFORMER AND METHOD OF MAKING THE SAME

(75) Inventor: William J. LaBarge, Bay City, MI (US)

(73) Assignee: Umicore AG & Co. KG, Hanau (DE)

( * ) Notice: Subject to any disclaimer, the term of this patent is extended or adjusted under 35 U.S.C. 154(b) by 416 days.

(21) Appl. No.: 11/058,564

(22) Filed: Feb. 15, 2005

(65) Prior Publication Data

US 2006/0179717 A1    Aug. 17, 2006

(51) Int. Cl.
B01J 23/04 (2006.01)
B01J 8/00 (2006.01)
C07C 5/02 (2006.01)

(52) U.S. Cl. .................. 502/439; 502/102; 502/103; 502/104; 502/110; 502/303; 502/308; 48/127.9; 585/250; 585/252; 585/263; 585/271; 585/272; 585/275; 585/266; 422/192; 422/193; 422/198; 422/211

(58) Field of Classification Search ............... 48/127.9; 422/192, 193, 198, 211; 585/250, 252, 263, 585/271, 272, 275, 266; 502/439, 102, 103, 502/104, 110, 303, 308
See application file for complete search history.

(56) References Cited

U.S. PATENT DOCUMENTS

| 2,708,187 | A | * | 5/1955 | Kearby | 502/230 |
|---|---|---|---|---|---|
| 3,846,342 | A | * | 11/1974 | Hensley et al. | 502/306 |
| 4,089,038 | A | * | 5/1978 | Bacher | 361/320 |
| 4,240,934 | A | * | 12/1980 | Mieville | 502/332 |
| 4,460,704 | A | * | 7/1984 | Twigg | 502/302 |
| 4,526,885 | A | * | 7/1985 | Day et al. | 502/327 |
| 4,567,117 | A | * | 1/1986 | Patel et al. | 429/19 |
| 4,581,157 | A | * | 4/1986 | Twigg | 252/373 |
| 4,738,946 | A | * | 4/1988 | Yamashita et al. | 502/303 |
| 4,885,080 | A | * | 12/1989 | Brown et al. | 208/218 |
| 5,010,051 | A | * | 4/1991 | Rudy | 502/304 |
| 5,130,114 | A | * | 7/1992 | Igarashi | 423/652 |
| 5,679,614 | A | * | 10/1997 | Bangala et al. | 502/302 |
| 5,756,207 | A | * | 5/1998 | Clough et al. | 428/375 |
| 5,939,569 | A | * | 8/1999 | Jones et al. | 549/512 |
| 6,074,457 | A | * | 6/2000 | Anthonis et al. | 95/45 |
| 7,094,730 | B2 | * | 8/2006 | LaBarge et al. | 502/332 |
| 7,105,148 | B2 | * | 9/2006 | Petch et al. | 423/652 |
| 2001/0046462 | A1 | * | 11/2001 | Woods et al. | 422/211 |
| 2002/0147103 | A1 | * | 10/2002 | Ruettinger et al. | 502/66 |
| 2002/0155329 | A1 | * | 10/2002 | Stevens | 429/17 |
| 2002/0188161 | A1 | * | 12/2002 | Kallenbach | 585/266 |
| 2003/0105172 | A1 | * | 6/2003 | Bowe et al. | 518/728 |
| 2004/0005270 | A1 | * | 1/2004 | Xu et al. | 423/651 |
| 2004/0077494 | A1 | * | 4/2004 | LaBarge et al. | 502/303 |
| 2004/0138060 | A1 | * | 7/2004 | Rapier et al. | 502/302 |
| 2004/0220436 | A1 | * | 11/2004 | Birke et al. | 585/270 |
| 2005/0135977 | A1 | * | 6/2005 | Park et al. | 422/180 |

OTHER PUBLICATIONS

Kaya, et al. "Zirconia-toughened alumina ceramics of helical spring shape with improved properties from extruded sol-derived pastes" Scripta Materialia 48 (2003) 359-364.
Aza, et al. "Slow-Crack-Growth Behavior of Zirconia-Toughened Alumina Ceramics Processed by Different Methods" J. Am. Ceram. Soc., 86 [1] 115-20 (2003).
Mangalaraja, et al. "Effect of ceria on the physical, mechanical and thermal properties of yttria stabilized zirconia toughened alumina" Materials Science and Engineering A343 (2003) 71-75.
Guo, et al. "Low temperature ageing in water vapor and mechanical properties of ZTA ceramics". Materials Letters 56 (2002) 1014-1018.
Mitra, et al. "Effect of CeO2 on the sintering behaviour of zirconia-alumina composite" Ceramics International 28 (2002) 827-833.
Guo, et al. "In situ formation of LaAl11O18 rodlike particles in ZTA ceramics and effect on the mechanical properties". Ceramics International 28 (2002) 699-704.
Shim, et al. "Synthesis and Characterization of Al2O3/ZrO2, Al2O3/TiO2 and Al2O3/ZrO2/TiO2 Ceramic Composite Particles Prepared by Ultrasonic Spray Pyrolysis" Bull. Korean Chem. Soc. 2002, vol. 23, No. 8 1127-1134.
Cui, et al. "Formation Mechanism of Intragranulars in Nano-scale/Micron ZTA Composties Ceramics" Key Engineering Materials vols. 224-226 (2002) pp. 291-294.
Jin, et al. "Microstructured and Mechanical Performances of High Strength ZTA/LaAl11O18 Composites" Key Engineering Materials vols. 244-226 (2002) pp. 301-304.
Zawada, et al. "Characterization and High-Temperature Mechanical Behavior of an Oxide/Oxide Composite" J. Am. Ceram. Soc. 86 [6] 981-90 (2003).
Lee, et al. "Toughened Oxide Composites Based on Porous Alumina-Platelet Interphases" J. Am. Ceram. Soc., 84 [4] 767-74 (2001).
Fan, et al. "Computer Simulation of Grain Growth and Ostwald Ripening in Alumina-Zirconia Two-Phase Composites" J. Am. Ceram. Soc. 80 [7] 1773-80 (1997).
Agrafiotis, et al. "Effect of Slurry Rheological Properties on the Coating of Ceramic Honeycombs with Yttria-Stabilized-Zirconia Washcoats" J. Am. Ceram. Soc., 83 [5] 1033-38 (2000).
Mishra, et al. "Effect of cerium zirconnate (Ce2Zr2O7) on microstructure and mechanical properties of Ce-ZTA" Journal of Materials Science 37 (2002) 197-202.
Huang, et al. "Microstructure and mechanical properties of ZTA fabricated by liquid phase sintering" Ceramics International 29 (2003) 765-769.
Gao, et al. "Influences of microwave and conventional sintering on the wear behavior of Al2O3-ZrO2 ceramics" Journal of Inorganic Materials 17 (3) : 621-626 May 2002.

* cited by examiner

*Primary Examiner*—Walter D Griffin
*Assistant Examiner*—Huy-Tram Nguyen
(74) *Attorney, Agent, or Firm*—Robert G. Weilacher; Smith, Gambrell & Russell

(57) ABSTRACT

A reformer comprises a housing; a substrate disposed in the housing, wherein the substrate comprises a stabilized aluminate and a stabilized zirconate; and a catalyst disposed on the substrate.

22 Claims, 1 Drawing Sheet

REFORMER AND METHOD OF MAKING THE SAME

BACKGROUND

A reformer, which can also be referred to as a fuel processor, can convert a hydrocarbon fuel (e.g., methane, propane, natural gas, gasoline, diesel, gas oils, oxygenated hydrocarbons, and the like) to hydrogen or to a less complex hydrocarbon. More particularly, fuel reforming can comprise mixing a hydrocarbon fuel with air, water, and/or steam in a mixing zone of the reformer prior to entering a reforming zone of the reformer, and converting the hydrocarbon fuel into, for example, hydrogen ($H_2$), byproducts (e.g., carbon monoxide (CO), methane ($CH_4$), inert materials (e.g., nitrogen ($N_2$), carbon dioxide ($CO_2$), and water ($H_2O$)). Common approaches can include steam reforming, partial oxidation, and dry reforming.

Steam reforming involves the use of a fuel and steam ($H_2O$) that can be reacted in heated tubes filled with a catalyst(s) to convert the hydrocarbons into principally synthesis gas (hydrogen and carbon monoxide). The steam reforming reactions are endothermic, thus the steam reformers can be designed to transfer heat into the catalytic process. An example of the steam reforming reaction is as follows:

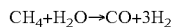
$$CH_4 + H_2O \rightarrow CO + 3H_2$$

Partial oxidation reformers are based on substoichiometric combustion to achieve the temperatures sufficient to reform the hydrocarbon fuel. Decomposition of the fuel to primarily hydrogen and carbon monoxide can occur through thermal reactions at high temperatures, e.g., about 700 degrees Celsius (° C.) to about 1,200° C. Catalysts have been used with partial oxidation systems (catalytic partial oxidation) to promote conversion of various fuels into synthesis gas. The use of a catalyst can result in acceleration of the reforming reactions and can provide this effect at lower reaction temperatures than those that would otherwise be required in the absence of a catalyst. An example of the partial oxidation reforming reaction is as follows:

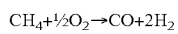
$$CH_4 + \tfrac{1}{2}O_2 \rightarrow CO + 2H_2$$

Dry reforming involves the creation of hydrogen and carbon monoxide in the absence of water, for example, using carbon dioxide as the oxidant. Dry reforming reactions, like steam reforming reactions, are endothermic processes. An example of the dry reforming reaction is depicted in the following reaction:

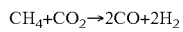
$$CH_4 + CO_2 \rightarrow 2CO + 2H_2$$

Practical reformers can comprise a combination of these idealized processes. Thus, a combination of air, water or recycled exhaust gas can be used as the oxidant in the fuel reforming process.

The catalyst material of the reformer can be disposed on a substrate (e.g., a ceramic material, a metal, and the like). It is noted that the substrate can be subjected to an extreme hydrothermal hydrogen reforming environment (e.g., greater than or equal to about 20 vol. % hydrogen at temperatures up to about 1600° C.), which can cause grain growth in the substrate that can lead to reformer degradation (e.g., cracking in the substrate, and the like).

Therefore, what is needed in the art is an improved reformer substrate.

SUMMARY

Disclosed herein are a reformer and a method of making the reformer.

In one embodiment, a reformer comprises a housing; a substrate disposed in the housing, wherein the substrate comprises a stabilized aluminate and a stabilized zirconate; and a catalyst disposed on the substrate.

In another embodiment, a reformer comprises a housing; a substrate disposed in the housing, wherein the substrate comprises a stabilized titanate and at least one of a stabilized aluminate or a stabilized zirconate; and a catalyst disposed on the substrate.

In one embodiment, a method of making a reformer comprises disposing a substrate comprising a stabilized aluminate and a stabilized zirconate in a housing.

The above-described and other features will be appreciated and understood by those skilled in the art from the following detailed description, drawing, and appended claims.

BRIEF DESCRIPTION OF THE DRAWINGS

Refer now to the FIGURE, which is an exemplary embodiment, and wherein the like elements are numbered alike.

DETAILED DESCRIPTION

Figure 1:
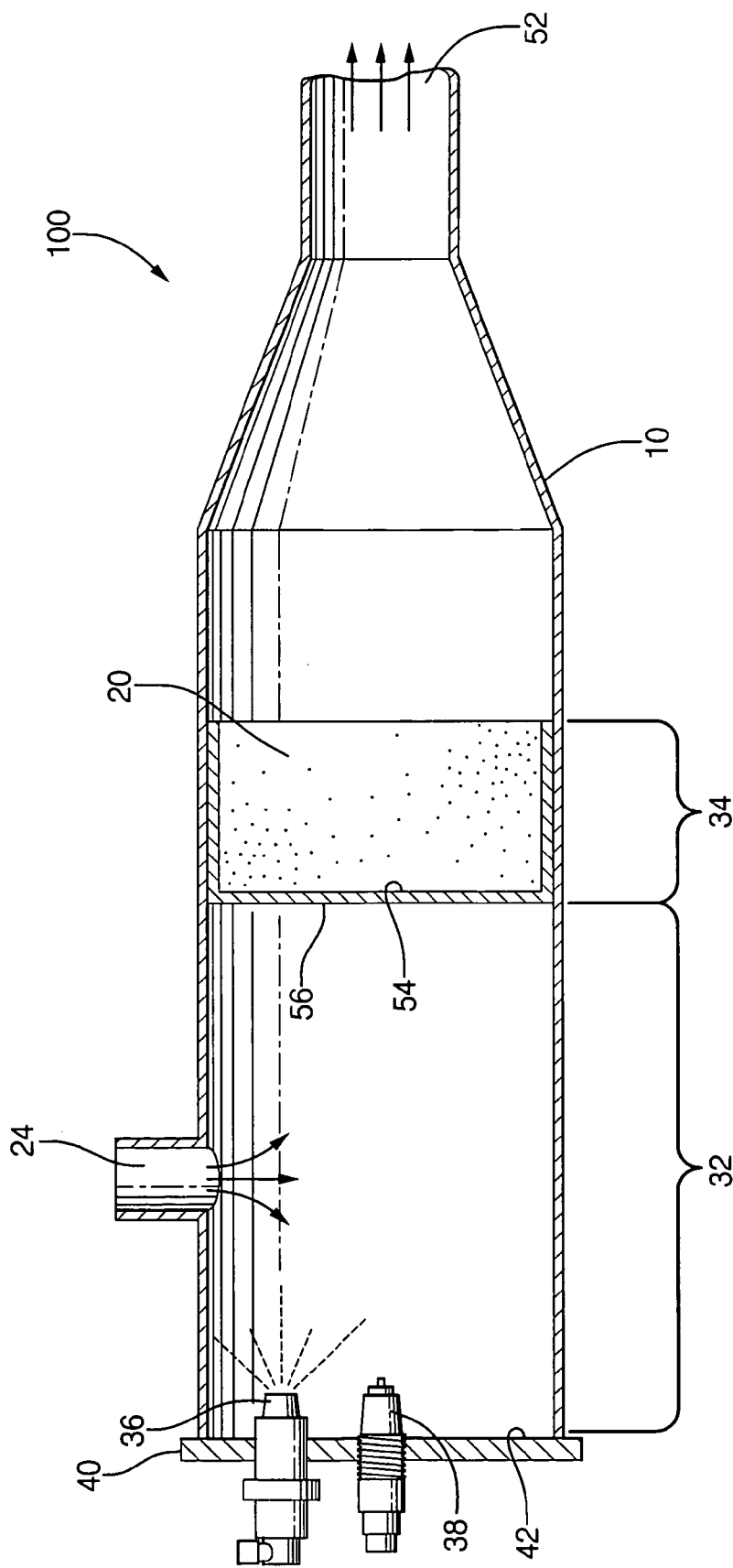
FIG. 1 is a cross-sectional view of an embodiment of a reformer.

It should first be noted that the terms "first," "second," and the like herein do not denote any order or importance, but rather are used to distinguish one element from another, and the terms "a" and "an" herein do not denote a limitation of quantity, but rather denote the presence of at least one of the referenced items. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," are inclusive of the endpoints and all intermediate values of the ranges, e.g., "about 5 wt. % to about 25 wt. %, about 5 wt. % to about 15 wt. %", etc.).

Disclosed herein is a reformer, more particularly a substrate for a reformer, wherein the substrate can be stable in the presence of hydrogen and steam at extremely high temperatures (e.g., temperatures greater than or equal to about 1,400° C., more particularly temperatures of about 1,400° C. to about 1,600° C.). As will be discussed in much greater detail, the substrate can comprise at least two of the following: a stabilized aluminate, a stabilized zirconate, a stabilized titanate, and the like.

The reformer disclosed herein can readily be adapted for use in any system where hydrocarbon fuels are processed to hydrogen or less complex hydrocarbons, such as a fuel cell system (e.g., solid oxide fuel cell (SOFC) system, proton exchange membrane (PEM) system, and the like), an internal combustion engine system (e.g., an engine system fueled with diesel fuel, gasoline, and the like), chemical processes employing hydrogen as a reactant, and the like.

Referring now to FIG. 1, an exemplary reformer generally designated 100 is illustrated. While the reformer 100 can comprise a multi-sided cross-sectional shape (e.g., substantially square, triangular, pentagonal, hexagonal, heptagonal, octagonal, and the like) or rounded shape (e.g., cylindrical, oval, and the like), reference is made to a substantially, cylindrically shaped reformer 100 merely for convenience in discussion. The reformer 100 can comprise a housing 10, a substrate 20, a fuel injector 36, an igniter 38, and a retention material 56.

The housing 10 can be disposed around the substrate 20. Disposed between the housing 10 and the substrate 20 can optionally be the retention material 56. The substrate 20 can be disposed within housing 10 such that an optional mixing zone 32 can be defined within the housing upstream of the substrate 20. The mixing zone 32 can be defined by a distance from an inner surface 42 of an end plate 40, which can have the fuel injector 36 in physical communication therewith, to a face 54 of the substrate 20. In other embodiments, the housing 10 can comprise a cone shaped member, multiple cone shaped members, or members comprising various other shapes in place of or in addition to the end plate 40. The fuel injector 36 can be disposed in physical communication with the housing 10 such that the fuel injector 36 can be in fluid communication with the mixing zone 32.

The retention material 56 can be disposed around the substrate 20 to retain the substrate 20 in position relative to the housing 10. More particularly, the retention material 56 can apply a compressive radial force about the substrate 20, thereby reducing the axial movement of the substrate 20 and retaining the substrate 20 in place within the housing 10.

Furthermore, as briefly mentioned above, the housing 10 can be segmented into the optional mixing zone 32 and a reforming zone 34. Generally, the mixing zone 32 can be the portion of the reformer 100 in which fluid (e.g., air, exhaust gas recirculation (EGR), and the like) can enter the housing 10 via an inlet 24, and can be mixed with fuel from the fuel injector 36. The fuel injector 36 can atomize and/or otherwise disperse the fuel into the mixing zone 32. Generally, the reforming zone 34 can comprise substrate 20 comprising a catalyst(s). The reforming zone 34 can be in fluid communication with the mixing zone 32 such that fluid, fuel, and/or combustion products can enter the reforming zone 34 where they can be converted to reformate, for example, hydrogen ($H_2$), byproducts (e.g., carbon monoxide (CO), methane ($CH_4$), inert materials (e.g., nitrogen ($N_2$), carbon dioxide ($CO_2$), and water ($H_2O$)). It is noted that the fuel can be reformed by, for example, any of the above described reforming processes, e.g., steam reforming, partial oxidation reforming, dry reforming, and the like, as well as combinations comprising at least one of the forming reforming processes. The reformate can then exit the reformer 100 via an outlet 52. In various other embodiments, the fluid and the fuel can be mixed and reformed within reformer zone 34.

The housing 10 can comprise any material that is capable of resisting under-car salt, corrosion, and high temperatures, e.g., temperatures greater than or equal to about 600° C. For example, ferrous materials can be employed such as ferritic stainless steels. Ferrite stainless steels can include stainless steels such as, e.g., the 400—Series such as SS-409, SS-439, and SS-441.

The substrate 20 can be capable of operating at temperatures up to about 1,600° C.; capable of withstanding strong reducing environments in the presence of water containing, for example, hydrocarbons, hydrogen, carbon monoxide, water, oxygen, sulfur and sulfur-containing compounds, combustion radicals, such as hydrogen and hydroxyl ions, and the like, and carbon particulate matter; and can comprise a sufficient surface area and structural integrity to support the desired catalyst and catalyst support material. Although the reformer substrate 20 can have any size or geometry, the size and geometry can be selected to optimize the surface area in the given reformer design parameters. The reformer substrate 20 can have an open cell reticulated foam structure, or an extruded honeycomb cell geometry, with the cells being any multi-sided or rounded shape, with substantially square, hexagonal, octagonal or similar geometries desired due to increased surface area and structural integrity. For example, the reformer substrate 20 can be formed into a cell structure with a plurality of cells arranged in a honeycomb pattern using a reticulated foam process, and the like.

The substrate 20 can comprise both aluminates (such as lanthanum aluminate $LaAlO_3$, lanthanum hexaaluminate $LaAl_{11}O_{18}$, and the like) and zirconates (such as lanthanum zirconate $La_2Zr_2O_7$, and the like). More particularly, the aluminate can be stabilized with a material that can make the aluminate more resistant to grain growth compared to unstabilized alumina. The zirconate can be stabilized with a material that can make the zirconate more resistant to phase change compared to unstabilized zirconia. Moreover, it is to be understood that grain boundary doping stabilized aluminate with stabilized zirconate can be employed in making a zirconate toughened aluminate (ZTA) substrate. More particularly, a ZTA substrate can comprise greater than or equal to about 70 vol. % stabilized aluminate, particularly greater than or equal to about 75 vol. % stabilized aluminate, and more particularly about 80 vol. % to about 90 vol. % stabilized aluminate; and less than or equal to about 30 vol. % stabilized zirconate, particularly less than or equal to about 25 vol. % stabilized zirconate, and more particularly about 10 vol. % to about 20 vol. % stabilized zirconate, wherein the volume percents are based on a total volume of the substrate materials. Furthermore, without being bound by theory, the zirconate existing in the aluminate grain boundaries can comprise aggregations of less than or equal to about 0.2 micrometers (measured along the major diameter (i.e., the longest diameter)).

The stabilized aluminate and the stabilized zirconate can be employed in making an aluminate toughened zirconate (ATZ) substrate, i.e., a substrate comprising greater than or equal to about 60 vol. % stabilized zirconate, more particularly greater than or equal to about 72 vol. % stabilized zirconate; and less than or equal to 40 vol. % stabilized aluminate, more particularly less than or equal to about 28 vol. % stabilized aluminate, wherein volume percents are based on a total volume of the substrate materials. In this embodiment, the aluminate can exist in the zirconate grain boundaries.

Additionally, without being bound by theory, embodiments are envisioned wherein the substrate can comprise titanate. For example, the substrate can comprise stabilized titanate, stabilized aluminate, stabilized zirconate, and any combination comprising at least two of the forgoing. The titanate stabilizer can comprise a material(s) that when disposed within the titania crystalline structure can decrease the rate of grain growth of the titania under reforming conditions. Suitable stabilizers for inhibiting titania grain growth include, but are limited to $M^{+3}$ or higher valent metals, which can inhibit grain growth by forming titanate structures. Suitable stabilizers include those materials discussed above with regards to the stabilized aluminate and/or the stabilized zirconate.

The alumina stabilizer can comprise a material(s) that when disposed within the alumina crystalline structure can decrease the rate of grain growth of the alumina under reforming conditions. Suitable stabilizers for inhibiting alumina grain growth include, but are limited to $M^{+3}$ or higher valent metals, which can inhibit grain growth by forming aluminate structures. For example, exemplary aluminates include, lanthanum hexaaluminate ($LaAl_{11}O_{18}$), barium hexaaluminate ($BaAl_{12}O_{19}$), and the like. Other examples include, but are not limited to, rare earth aluminates (such as lanthanum aluminate ($LaAlO_3$), neodymium aluminate ($NdAlO_3$), praseodymium aluminate ($PrAlO_3$), and the like). Some rare earth stabilized hexaaluminates can comprise lanthanum (forming, e.g., $LaAl_{11}O_{18}$), praseodymium (forming, e.g., $PrAl_{11}O_{18}$), and cerium (forming, e.g., $CeAl_{11}O_{18}$).

The zirconia stabilizer can comprise a $M^{+3}$ or higher valent material(s) that when disposed within the zirconia crystalline structure can decrease the rate of grain growth of the zirconia under reforming conditions. Suitable stabilizers for inhibiting zirconia grain growth include, but are not limited to, $M^{+3}$ or higher valent metals, which can inhibit grain growth by forming zirconate structures. For example, exemplary zirconates include, but is not limited to, $A_2Zr_2O_7$ pyrochlores, wherein A is cerium (Ce), lanthanum (La), yttrium (Y), neodymium (Nd), gadolinium (Gd), and the like (such as cerium zirconate ($Ce_2Zr_2O_7$), neodymium zirconate ($Nd_2Zr_2O_7$), yttrium zirconate ($Y_2Zr_2O_7$), lanthanum zirconate ($La_2Zr_2O_7$), gadolinium-zirconate ($Gd_2Zr_2O_7$), mixtures such as ($La_{0.8}Ce_{0.2})_2Zr_2O_7$ and the like).

Without being bound by theory, zirconate toughened aluminates can possess the following advantageous characteristics: (1) the ability to withstand a maximum service temperature value of about 1,600° C.; (2) ultra high thermal shock resistance (e.g., capable of withstanding greater than or equal to 100 thermal cycles, wherein a cycle comprises heating the substrate to a temperature of about 1165° C. and cooling down to room temperature (about 21° C. to 23° C.) blowing room temperature air over the substrate); (3) resistance to corrosive influence of hydrogen, water, and carbon monoxide at temperatures up to about 1,600° C.; (4) resistant to migration of grain boundary stabilizing elements at temperatures up to about 1,600° C.; (5) resistant to reforming catalyst corrosive materials (such as alkaline earth elements, transition metal oxides, phosphorus oxides, nitrogen oxides, sulfur oxides, and the like) at temperatures up to 1,600° C.

Without being bound by theory, it has unexpectedly been discovered that stabilizing both alumina (aluminate) and zirconia (zirconate) can greatly reduce the grain growth of each of the alumina and zirconia compared to the grain growth that can be obtained by only stabilizing either the alumina or the zirconia. Since relatively small grain sizes of stabilized alumina and stabilized zirconia can contribute to the structural integrity of the substrate 20, the useful life of the substrate 20 can be increased. In varying embodiments, the stabilized alumina (e.g., aluminate) and the stabilized zirconia (e.g., zirconate) can each have a grain size (measured along the major diameter) of less than or equal to about 0.1 micrometers.

In an embodiment, the aluminate particles can comprise agglomerations of pseudocrystalline aluminate primary particles, wherein the primary particles comprise a particle size of less than or equal to about 30 nanometers (nm) (measured along the major diameter (i.e., the longest diameter)). The aluminate agglomerated particles can have size measured along the major diameter of the agglomeration of about 3.0 micrometers to about 7.0 micrometers. The zirconate primary particles can have a size measured along the major diameter of less than or equal to about 20 nm.

The substrate 20 can be formed by any suitable method. For example, the substrate 20 can be formed into a cell structure with a plurality of cells arranged in a honeycomb pattern using an extrusion technique, and the like. More particularly, the extrusion technique can be a mechanical operation that can form the substrate 20 into the desired shape by extruding wet, soft substrate material from a die with patterned openings, with any combination of cell density and cell wall thickness imparted to the resulting cellular structure.

In various embodiments, a metal alkoxide compound can be added as a hardening agent to the substrate materials. For example, the metal alkoxide can be added in an amount of about 2 wt. % to about 4 wt. % based upon the combined weight of the aluminate and the zirconate. The alkoxides component can comprise methoxides, ethoxides, propoxides, isopropoxides, butoxides, ethylhexoxides and triethanolamino-isopropoxides, and combinations comprising at least one of the foregoing. More particularly, alkoxide hardening agents can include aluminum isopropoxide, zirconium isopropoxide, and the like.

Disposed on and/or throughout (hereinafter "on" for convenience in discussion) the substrate 20 can be a catalyst(s). The catalyst disposed on the substrate 20 can be applied by any suitable method. For example, the catalyst can be washcoated, imbibed, impregnated, physisorbed, chemisorbed, precipitated, or otherwise applied onto the substrate. Possible catalysts include catalytic metals, such as platinum, palladium, rhodium, iridium, ruthenium, gold, silver, nickel, copper, and the like, and oxides, mixtures, and alloys comprising at least one of the foregoing metals.

Various catalyst support materials can be employed to support the catalyst. The catalyst support materials can include, but are not limited to, hexaaluminates, aluminates, aluminum oxides (e.g., gamma-aluminum oxide, theta-aluminum oxide, delta-aluminum oxide), gallium oxides, zirconium oxides, titanium oxides, yttrium oxides, lanthanum oxides, cerium oxides, scandium oxides, and the like, as well as combinations comprising at least one of the foregoing.

EXAMPLE 1

In preparing a cerium zirconate ($La_2Zr_2O_7$) component of a substrate, lanthanum zirconate was synthesized by a sol-gel method using urea decomposition of zirconium and lanthanum alkoxide sols in 1.0:1.0 molar ratios. The slurries were then dried at 110° C. for 24 hours. The dried slurries were then calcined to 1,200° C. for 1 hour in flowing nitrogen ($N_2$). The mean grain size of the $La_2Zr_2O_7$ was about 0.1 micrometers.

In preparing a lanthanum aluminate ($LaAlO_3$) component of the substrate, lanthanum aluminate powders were made by coprecipitation of $La(NO_3)_3$ and $Al(NO_3)_3$ in 1.0:1.0 molar ratios. The precipitated $LaAlO_3$ powders were calcined at 800° C. for 4 hours.

About 103.0 grams $La_2Zr_2O_7$ (18 mol. % zirconate) and 176.2 grams $LaAlO_3$ (82 mol. % aluminate) were mixed with 202 ml of a 0.01 M nitric acid solution. The mixture was ball milled for 2 hours. The solids were filtered, washed, and then calcined at 740° C. for 2 hours.

The substrate was formed by extruding the lanthanum zirconate-lanthanum aluminate mixture into a shape 2.75 inches round and 2.0 inches long, having a cell density of 240 cells/$in^3$. The extruded substrate was subsequently microwave dried at 2.5 gigahertz (GHz) for 12 minutes. The microwave dried substrate was calcined at 1,400° C. for 4 hours.

The substrate was then coated with 7.0 grams per cubic inch (g/$in^3$) slurry containing 2.5 wt. % rhodium supported upon lanthanum hexaaluminate, wherein the weight percent was based upon the combined weight of the rhodium and the lanthanum hexaaluminate. The catalyst coating was dried at 110° C. for 30 minutes then calcined at 1,200° C. for 4 hours. The calcined catalyst substrate had a washcoat weight of 4.0 g/$in^3$ lanthanum hexaaluminate and 138 grams per cubic foot (g/$ft^3$) rhodium. The lanthanum hexaaluminate had a surface area of 94 square meters per gram ($m^2$/g).

EXAMPLE 2

Lanthanum aluminate powders were made by coprecipitation of $La(NO_3)_3$ and $Al(NO_3)_3$ in 1.0:1.0 molar ratios. The precipitated $LaAlO_3$ powders were calcined at 800° C. for 4 hours. Lanthanum zirconate was synthesized by precipitation of zirconium and lanthanum alkoxide sols in 1.0:1.0 molar ratios. The precipitated lanthanum zirconate powders were first dried at 110° C. for 4 hours and then calcined at 1,200° C. for 1 hour in flowing nitrogen ($N_2$). The lanthanum-aluminate and lanthanum-zirconate powders were then mixed into an 82 mol. % aluminate and 18 mol. % zirconate ratio.

An aqueous slurry containing 58 wt. % solids (82 mol. % aluminate: 18 mol. % zirconate powder), 4 wt. % aluminum isopropoxide and 38 wt. % water was mixed for 20 minutes with a high shear mixer. The aluminum isopropoxide was added as a hardening agent. The resulting slurry was ball milled in a sweeco mill with ⅜ inch cylindrical alumina milling media for 45 minutes. The resulting $d_{90}$ particle size was 8.2 micrometers (e.g., 90% of the particles had a size, as measured along the major diameter, of greater than or equal to about 8.2 micrometers).

The aqueous slurry was poured over a reticulated polyurethane foam (an organic foam material). The reticulated foam structure was about 3.2 inches round and about 1.25 inches long, having a cell density of 20 pores per inch (ppi) were coated with slurry and any excess slurry was filtered off. The $LaAlO_3$—$La_2Zr_2O_7$ coated polyurethane foam was then heated to 600° C. at a rate of 2° C. per minute, and then held at 600° C. for 3 hours. The $LaAlO_3$—$La_2Zr_2O_7$ substrate was then heated to 1,400° C. at a rate of 10° C. per minute, and then held at 1,400° C. for 4 hours. The $LaAlO_3$—$La_2Zr_2O_7$ foam substrate was subsequently coated with catalytically active material.

The reticulated foam substrate was coated with 7.0 g/in³ slurry containing solids of 2.5 wt % rhodium supported upon lanthanum hexaaluminate, wherein the weight percent was based upon the combined weight of the rhodium and the lanthanum hexaaluminate. The catalyst coating was dried at 110° C. for 30 minutes then calcined at 1,200° C. for 4 hours. The calcined catalyst/substrate had a washcoat weight of 4.0 g/in³ lanthanum hexaaluminate and 138 g/ft³ rhodium. The lanthanum hexaaluminate had a surface area of 94 m²/g.

The catalyst/substrate can be impregnated with a water solution of rhodium hexamine nitrate. The rhodium-hexamine doped lanthanum stabilized delta aluminum oxide was dried and calcined at 1,200° C. for 4 hours.

Advantageously, the reformer substrate disclosed herein comprises both stabilized aluminate and stabilized zirconate. It has unexpectedly been discovered that grain growth of zirconia and/or alumina can greatly be reduced when both the zirconia and the alumina are stabilized compared to a substrate neither of the zirconia or the alumina have been stabilized and where only one of the zirconia and alumina have been stabilized. In other words, the substrate comprising both stabilized alumina and stabilized zirconia can comprise smaller grain sizes and better grain size stability compared to substrates that do not have both stabilized alumina and stabilized zirconia.

The substrate can maintain mechanical strength in higher temperatures and/or under more severe reducing conditions compared to substrates that do not have stabilized alumina and stabilized zirconia. This can allow the reformer to operate at higher temperatures and/or utilize fuels that create more severe reducing conditions. Further, the substrate can maintain its mechanical strength and is thus more durable under reformer operating conditions compared to substrates that do not have stabilized alumina and stabilized zirconia. Due to the ability of substrate to maintain its mechanical strength, the substrate can comprise shapes with thinner wall structures, higher surface areas, while still maintaining mechanical strength for functionality compared to substrates that do not have stabilized alumina and stabilized zirconia. The reformer utilizing the substrate comprising thinner wall structures, higher surface areas can have better reaction efficiencies and less material cost. Further, by retaining its mechanical strength, the substrate can be less susceptible to failures including those resulting from stressed induced cracks caused by external forces on the substrate or caused by thermal expansion. The substrate can therefore increase the operating life of the reformer over those of a reformer comprising substrate in which both the alumina or the zirconia is not stabilized.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A reformer comprising:
   a housing;
   a substrate disposed in the housing, wherein the substrate is stable in the presence of hydrogen and steam at a temperature of equal to or greater than about 1400° C. and comprises a stabilized aluminate and a stabilized zirconate; and
   a catalyst disposed on the substrate.

2. The reformer of claim 1, wherein the substrate is a zirconate toughed aluminate substrate comprising greater than or equal to about 70 vol. % of the stabilized aluminate; and less than or equal to about 30 vol. % of the stabilized zirconate, wherein volume percent is based on a total volume of substrate materials.

3. The reformer of claim 2, wherein the substrate comprises about 80 vol. % to about 90 vol. % of the stabilized aluminate, and about 10 vol. % to about 20 vol. % of the stabilized zirconate.

4. The reformer of claim 1, wherein the substrate is an aluminate toughened zirconate substrate comprising greater than or equal to about 60 vol. % of the stabilized zirconate; and less than or equal to about 40 vol. % of the stabilized aluminate, wherein volume percent is based on a total volume of substrate materials.

5. The reformer of claim 4, wherein the substrate comprises greater than or equal to about 72 vol. % of the stabilized zirconate; and less than or equal to about 28 vol. % of the stabilized aluminate.

6. The reformer of claim 1, wherein the stabilized aluminate and the stabilized zirconate are each independently stabilized with an $M^{+3}$ or higher valent metal.

7. The reformer of claim 1, wherein the stabilized aluminate is selected from the group consisting of lanthanum hexaaluminate, barium hexaaluminate, lanthanum aluminate, neodymium aluminate, praseodymium aluminate, and mixtures thereof.

8. The reformer of claim 1, wherein the stabilized zirconate is selected from the group consisting of cerium zirconate, neodymium zirconate, yttrium zirconate, lanthanum zirconate, gadolinium-zirconate, and mixtures thereof.

9. The reformer of claim 1, wherein each of the stabilized aluminate and the stabilized zirconate have a grain size measured along a major diameter of less than or equal to about 0.1 micrometers.

10. A reformer comprising:
a housing;
a substrate disposed in the housing, wherein the substrate is stable in the presence of hydrogen and steam at a temperature of equal to or greater than about 1400° C. and comprises a stabilized titanate and at least one of a stabilized aluminate and a stabilized zirconate; and
a catalyst disposed on the substrate.

11. The reformer of claim 10, wherein the stabilized aluminate and the stabilized zirconate are each independently stabilized with an $M^{+3}$ or higher valent metal.

12. The reformer of claim 10, wherein the stabilized aluminate is selected from the group consisting of lanthanum hexaaluminate, barium hexaaluminate, lanthanum aluminate, neodymium aluminate, praseodymium aluminate, and mixtures thereof.

13. The reformer of claim 10, wherein the stabilized zirconate is selected from the group consisting of cerium zirconate, neodymium zirconate, yttrium zirconate, lanthanum zirconate, gadolinium-zirconate, and mixtures thereof.

14. A method of making a reformer comprising:
disposing a substrate in a housing, wherein the substrate is stable in the presence of hydrogen and steam at a temperature of equal to or greater than about 1400° C. and comprises a stabilized aluminate and a stabilized zirconate.

15. The method of claim 14, wherein the substrate is a zirconate toughed aluminate substrate comprising greater than or equal to about 70 vol. % of the stabilized aluminate; and less than or equal to about 30 vol. % of the stabilized zirconate, wherein volume percent is based on a total volume of substrate materials.

16. The method of claim 14, wherein the substrate is an aluminate toughened zirconate substrate comprising greater than or equal to about 60 vol. % of the stabilized zirconate, and less than or equal to about 40 vol. % of the stabilized aluminate, wherein volume percent is based on a total volume of substrate materials.

17. The method of claim 14, wherein the stabilized aluminate and the stabilized zirconate are each stabilized with an $M^{+3}$ or higher valent metal.

18. The method of claim 14, wherein the stabilized aluminate is selected from the group consisting of lanthanum hexaaluminate, barium hexaaluminate, lanthanum aluminate, neodymium aluminate, praseodymium aluminate, and combinations comprising at least one of the foregoing.

19. The method of claim 14, wherein the stabilized zirconate is selected from the group consisting of cerium zirconate, neodymium zirconate, yttrium zirconate, lanthanum zirconate, gadolinium-zirconate, and combinations comprising at least one of the foregoing.

20. The method of claim 14, wherein each of the stabilized aluminate and the stabilized zirconate have a grain size measured along a major diameter of less than or equal to about 0.1 micrometers.

21. A catalyst composite comprising:
a substrate which is stable in the presence of hydrogen and steam at a temperature of equal to or greater than about 1400° C., comprising a stabilized aluminate and a stabilized zirconate; and a catalyst disposed on the substrate,
wherein the stabilized aluminate and the stabilized zirconate are each independently stabilized with an $M^{+3}$ or higher valent metal whereby the aluminate is more resistant to grain growth compared to unstabilized alumina and the zirconate is more resistant to phase change compared to unstabilized zirconia.

22. A catalyst composite comprising:
a substrate which is stable in the presence of hydrogen and steam at a temperature of equal to or greater than about 1400° C., comprising a stabilized titanate and at least one of a stabilized aluminate and a stabilized zirconate; and
a catalyst disposed on the substrate,
wherein the stabilized aluminate and the stabilized zirconate are each independently stabilized with an $M^{+3}$ or higher valent metal whereby the aluminate is more resistant to grain growth compared to unstabilized alumina and the zirconate is more resistant to phase change compared to unstabilized zirconia.

* * * * *